Dec. 11, 1951  H. C. RATHKE  2,578,150
DECALCOMANIA AND METHOD OF APPLYING SAME
Filed Dec. 12, 1947
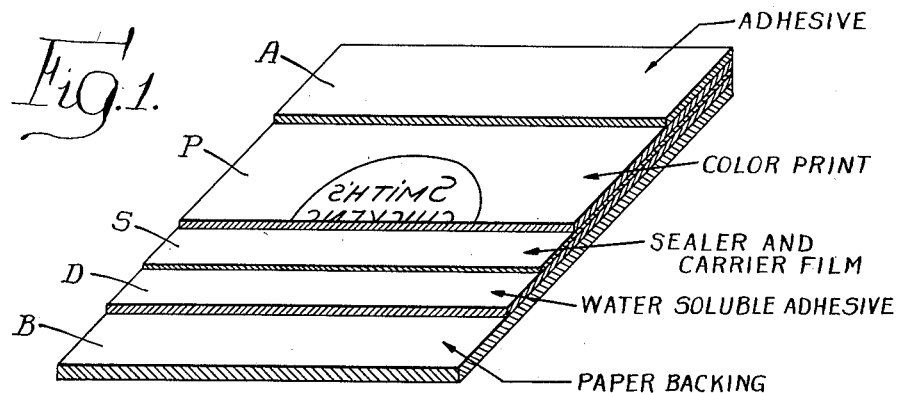
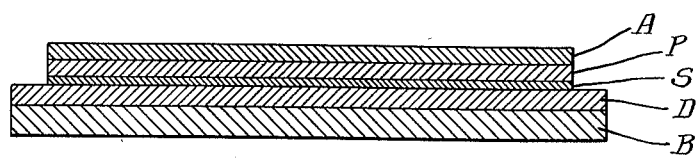
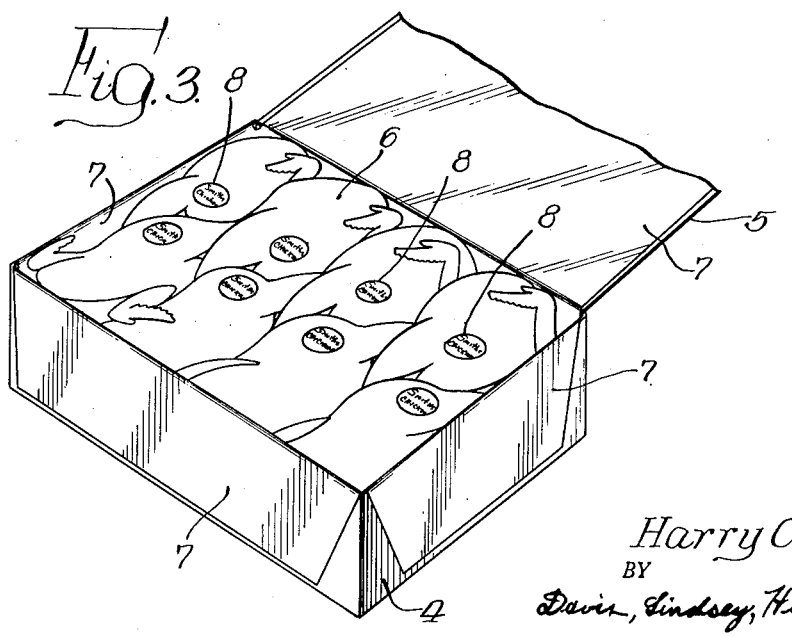
INVENTOR.
Harry C. Rathke,
BY
Davis, Lindsey, Hibben + Noyes
Attys.

Patented Dec. 11, 1951

2,578,150

UNITED STATES PATENT OFFICE 2,578,150

DECALCOMANIA AND METHOD OF APPLYING SAME

Harry C. Rathke, Chicago, Ill., assignor to The Meyercord Co., Chicago, Ill., a corporation of Illinois Application December 12, 1947, Serial No. 791,246

10 Claims. (Cl. 154—98)

This invention relates to an improved type of decalcomania transfer and more particularly to a novel decalcomania especially adapted for use on poultry and to a method of applying the same.

Paper stickers which have commonly been applied by gum adhesive or glue to poultry to indicate the packer's identity or trade name are notoriously unsatisfactory since they come off easily from the greasy skin of the fowl, are affected adversely by moisture, and are easily torn or mutilated. Similarly, no decalcomania has previously been available which was entirely satisfactory for use on poultry in spite of a widespread demand for such a transfer and even though transfers of the decalcomania type have been in common use for many years for a wide variety of advertising, labeling, and decorative purposes.

These earlier unsatisfactory decalcomania transfers for use on poultry failed because of their inability to meet the extreme operating requirements peculiar to poultry, particularly where the poultry was frozen after application of the transfers and partially thawed for resale. Such decalcomanias did not possess the following requirements necessary in a transfer acceptable for commercial use:

(1) It must adhere firmly to the greasy wet skin of the fowl;

(2) It must be flexible enough to conform to the rough or bumpy texture of the fowl's skin and must also be strong enough to avoid being punctured or pierced by hairs or pin feathers which may not have been removed in plucking;

(3) Its resistance to the effects of temperature must be such as to permit its easy application to the fowl in the packing room at low temperatures of the order of 30° to 45° F.;

(4) When applied to the fowl it must not have a sticky, exposed outer surface which would adhere to the wax paper in which the fowl is wrapped or to adjacent fowl when packed in a box;

(5) It must be capable of withstanding subzero quick-freezing conditions without becoming brittle and cracking;

(6) It must not "float away" when the fowl is defrosted;

(7) It must be easily removable by the user without cutting or otherwise damaging the skin of the fowl; and (8) It must be fabricated from and applied with materials which are completely edible and non-toxic in conformity with statutory requirements and regulations.

One object of the invention is to provide an improved type of decalcomania transfer having novel properties and uses.

A further object of the invention is to provide in a decalcomania transfer an improved sequential arrangement of the various layers whereby the decalcomania is suitable for use on meats and poultry.

An additional object of the invention is to provide a decalcomania which is satisfactory for use on dressed and packed poultry and which fulfills the various requirements hereinbefore set forth.

Another object of the invention is to provide a method for applying to poultry the novel decalcomanias herein disclosed.

Other objects and advantages of the invention will become apparent as this description progresses, reference being had to the accompanying drawing, in which:

Fig. 1 is a perspective view of a decalcomania transfer embodying the features of the present invention, with portions of the various layers being broken away to illustrate the laminar construction;

Fig. 2 is a cross-sectional view of the decalcomania shown in Fig. 1, the layers thereof being shown in exaggerated thickness for the purpose of clarity;

Fig. 3 is a perspective view of a packing crate or box filled with frozen poultry showing the decalcomanias in place on the fowl.

In Figs. 1 and 2 of the drawing the various layers are indicated by the letters B, D, S, P, and A in which order the several strata are applied in the process of manufacturing the decalcomanias. The letter B designates a paper backing, D a water soluble adhesive gum such as dextrine, S a sealer and carrier film described hereinafter in greater detail, P a composite layer of color prints comprising the transfer design, and A an adhesive layer for securing the transfer to the fowl.

The layer B is an absorbent paper backing or carrier such as the simplex type well known to the decalcomania art. This paper is surfaced with a layer D of a water soluble adhesive or gum such as dextrine, gelatine, gum tragacanth, etc., and, upon wetting with water, the layer D is softened or dissolved by water passing through the absorbent paper backing to permit the latter to be slid off or peeled from the transfer.

In the conventional "slip-off" type of decalcomania the layer next applied over the water soluble gum layer D is a color print or transfer design. However, it has been found that if the transfer design is printed directly over the water soluble gum layer D, the resultant decalcomania is not at all suitable for use on poultry because certain plasticizing materials contained in the printing inks, e. g. the linseed oil, tend to penetrate to some extent into the water soluble gum layer D. As a result of this mixing of the design layer with the water soluble gum layer, a substantial amount of gum adheres to and becomes incorporated in the exposed upper surface of the design after the decalcomania has been applied to the fowl and cannot be entirely washed off so as to present a clean, non-sticky exposed surface. Consequently, when the fowl is wrapped in waxed paper and particularly when the paper is pressed into intimate contact with the upper surface of the decalcomania under pressure exerted by a tightly fitting container or box, the paper sticks to the decalcomania, and thereafter the latter is torn and mutilated when the fowl is unwrapped thereby defeating the entire purpose of the packer in applying the decalcomania, namely, to bring his firm or trade name to the attention of the housewife or the retail store owner.

I have found that the above mentioned difficulty may be obviated by applying over the water soluble gum layer D a very thin, transparent sealer film S, of the order of .001 inch, of a pure cellulose nitrate lacquer which is nontoxic and substantially resin-free and which has a high degree of plasticity. A typical formula which I have found to be particularly suitable for the layer S comprises equal parts by volume of ½ second cellulose nitrate, castor oil, acetone, and xylene. In some cases a small percentage of dibutyl phthalate may be added to impart additional plasticity.

This film S when dry serves effectively to isolate the water soluble gum layer D and to prevent the penetration thereto of oils or other constituents in the printed design and succeeding layers. The layer S serves not only as a sealer to prevent adherence of the water soluble gum to the composite design layer but also constitutes a carrier film to provide a firm and flexible base for the succeeding design layers. Because the film S has relatively no affinity for the water soluble gum layer D, the gum which remains after the paper backing has been removed, may be readily and almost entirely washed off, thereby presenting a clean, smooth and non-sticky upper surface. Very small traces of gum that may remain will have no impairing effect on the practical operation of the transfer.

Over the layer S the desired transfer design layer P is imprinted by printing, screening, or lithographing, and this layer may comprise a composite design formed by superimposing various colored layers until the desired final design is obtained. The inks utilized in printing the design layer P are composed of edible and non-toxic materials of the various types well known in the art and may comprise linseed oil compositions pigmented with vegetable colors and entirely free from lead, arsenic, or other dangerous types of coloring materials. The tendency for the linseed oil contained in such inks to penetrate into the water soluble film D of the decalcomania is arrested by the sealer film S of nitrate lacquer thereby preventing any portion of the dextrine or other water soluble gum in the layer D from adhering to the transfer design P after its removal from the backing sheet B. The design layer P, as shown in Fig. 1, is printed in reverse with its surface to be viewed in contact with the transparent sealer film S so that when applied to a fowl the design or wording of the layer will be clearly visible and readable.

Over the composite design layer P is applied the adhesive layer A which is non-toxic and in its normal dry condition is non-sticky and non-pressure sensitive but can be activated or converted to an adhesive condition by the softening action of a suitable organic solvent prior to application of the transfer design to the skin of the fowl. The layer A contains, as its active constituent, ethyl cellulose which is substantially free from oils and resins. A typical formula which I have found to be satisfactory for this layer comprises four parts by volume of ethyl cellulose, three parts of ethyl alcohol, one part of butyl Cellosolve (2-butoxy ethanol), and one part of bleached white rosin.

The adhesive film A has a high degree of flexibility and possesses an affinity for the moisture and natural oils which exude more or less in the form of an emulsion from the skin of the freshly killed fowl. Since the adhesive layer A is non-sticky when dry, the finished decalcomanias can be readily stacked for storage without danger of their sticking together. The adhesive film A is preferably applied over the design layer P by means of a spot-printing technique in order to insure that the outer boundary of the layer A is confined within the periphery or marginal limits of the underlying layers P and S. If the adhesive A is allowed to overrun the edges of the layers P and S, the transfer will obviously present sticky spots on its exposed surface after application to the fowl and, as a result, the transfer will adhere to wrapping paper or other surfaces with which it may come in contact.

To apply the decalcomanias above described to the skin of a fowl at cold room temperatures of the order of 30° to 45° F., they may be soaked in water and then laid on a wet pad for a substantial period of time in advance of their actual application. During this time of contact with water, the layer S and the layers P and A carried thereon are released from the backing B by the solution and softening effects of the water on the layer D. As the transfers are to be applied to the fowl, each transfer is picked up individually and dipped in a container of ethyl alcohol or other suitable edible, non-toxic, organic solvent which will soften or otherwise activate or develop adhesive properties in the ethyl cellulose component of the adhesive layer A. The solvent used at this point not only activates the adhesive layer but also serves to disperse and remove excess water which may adhere to the adhesive layer from the preceding wetting step. In addition, the solvent is one which will not adversely affect the layers S or P but, on the contrary, will cause them to become somewhat more flexible to enable the entire decalcomania as a unit to closely adhere to the irregularities of the fowl's skin. The transfer is then applied under pressure directly to the fowl with the paper backing side B up or exposed and the activated adhesive layer A in intimate engagement with the skin of the fowl. The backing B may then be removed by a simple sliding motion exposing the view the color print P which is protected by the outermost layer S and the remaining water-softened gum may be readily washed from the surface of the layer S. The foregoing series of steps for applying the decalcomanias may be carried out as desired either by hand or by suitable machine techniques.

The layer A is of such character that it has a distinct affinity for the emulsion-like mixture of natural oils and moisture exuding from the skin of the fowl, and, consequently, the fowl oils and moisture migrate or penetrate upwardly into the layers A and P of the decalcomania into which they are readily received and assimilated. This migration or assimilation of the oils and moisture actually serves to increase the adhesive nature of the layer A thereby strengthening the adhesive bond with the skin of the fowl and in addition serves to retain the decalcomania in "live" or flexible condition under all conditions of use. The layer S of nitrate lacquer constitutes the outermost exposed surface of the decalcomania after application and, after being washed free of soluble gum, provides a satisfactory non-sticky wearing surface and also functions as a sealer to prevent the oils which have migrated from the skin of the fowl from penetrating to the exposed outer face of the decalcomania and causing it to stick to the waxed paper in which the fowl is wrapped for packing.

After the transfers have been applied to the fowl in the above manner, the ethyl alcohol or other edible solvent used evaporates within a short time, e. g. 15 minutes or less, and the fowl can be wrapped, packed, and frozen without any danger of harming or disfiguring the transfer design. Before freezing, the fowl, such as chickens, may be wrapped individually and then packed tightly in a box, or, as shown in Fig. 3, they may be pressed against each other in skin contacting relation so that the upper surface of the decalcomania of one chicken will be in intimate engagement with another chicken. Thereafter, protective sheets of waxed paper may be folded over the upper layer of chickens, as shown in Fig. 3, and then the lid of the box may be pressed down thereagainst and firmly secured in position, the unit then being ready for freezing.

Referring to Fig. 3 in detail, there is shown a box 4 having a lid 5 and being packed with a plurality of frozen fowl 6. A waxed paper lining 7 is provided to protect the fowl. Each fowl has applied thereto in a conspicuous place a decalcomania transfer 8 having the construction shown in Figs. 1 and 2. For the reasons hereinbefore set forth, the waxed paper 7, or the individual wrappings, may come in contact with the decalcomanias 8 with no danger of the decalcomanias sticking to the paper and being torn when the box is opened and the fowl unwrapped.

Furthermore, when the unfrozen fowl are packed tightly in the box 4 and are under considerable pressure, the skin of the fowl to which the decalcomania may have been applied, thereafter becomes wrinkled or drawn, but because of the thin, flexible, and adherent nature of the present decalcomania, the transfer also becomes wrinkled and drawn in the same degree without affecting the adhesive bond between the design layer P and the skin of the fowl. For all practical purposes, the decalcomania comprising the present invention becomes an integral part of the fowl's skin and successfully resists inadvertent removal. Freezing and thawing conditions do not cause it to become loosened nor is it pulled loose when the paper is removed or when one fowl is pulled from contact with another. After the box 4 is unpacked by a retail store owner and the fowl permitted to thaw to a display temperature of 35° to 50° F., the decalcomania label still remains firmly on the skin where it may be viewed by prospective purchasers to the advantage of the packer. However, after purchase, the housewife may readily remove the decalcomania by lightly scraping it with her thumbnail or a knife, and upon removal it will be found that the skin is free from unsightly and damaging marks or perforations.

Although only one specific embodiment of the invention has been described in detail and shown in the drawing, various modifications may be resorted to without departing from the scope of the invention as set forth in the appended claims.

I claim:

1. A decalcomania transfer comprising a porous backing having a water soluble adhesive coating thereon, a resin-free sealer film comprising cellulose nitrate lacquer applied directly upon said coating, a transfer design applied over said sealer film, and an organic solvent-softenable, resin-free adhesive layer comprising ethyl cellulose over said design.

2. A decalcomania transfer comprising a paper backing coated with a water soluble gum, a resin-free cellulose nitrate lacquer film directly upon the gum-coated surface of said backing, a transfer design applied over said lacquer film, and a resin-free adhesive layer comprising ethyl cellulose over said design.

3. A decalcomania transfer for use on poultry comprising a porous backing, a water soluble adhesive coating on said backing, a resin-free sealer film comprising cellulose nitrate lacquer directly over said water soluble adhesive coating, said sealer film being non-sticky and capable of being washed substantially free of said water soluble adhesive after application of the transfer, a transfer design applied over said sealer film, and an organic solvent-softenable, resin-free, adhesive layer comprising ethyl cellulose over said design for securing the transfer to the skin of a fowl, said sealer film, said transfer design, and said adhesive layer each being composed of edible and non-toxic ingredients.

4. A decalcomania transfer for use on poultry comprising an absorbent paper backing, a thin film of resin-free, non-toxic cellulose nitrate lacquer releasably secured to said backing by means of an intermediate coating of a water soluble adhesive in direct contact at one side thereof with said backing and at the other side thereof with said film, a non-toxic composite transfer design over said film, and a non-toxic, resin-free, ethyl cellulose-containing adhesive layer over said design adapted to engage the skin of a fowl, said film serving as a carrier for said design and adhesive layer upon release from said backing, and said film also serving as a sealer to prevent adherence of water soluble adhesive to said transfer design upon separation of said backing and to prevent penetration of natural oils from the skin of the fowl through said transfer design to the outer exposed surface of the transfer after application thereof.

5. A decalcomania transfer for use on poultry comprising a porous backing, a water soluble adhesive coating thereon, a resin-free sealer film comprising cellulose nitrate lacquer directly upon said coating, a transfer design applied over said sealer film, and an organic solvent-softenable, resin-free, adhesive layer comprising ethyl cellulose over said design for securing the transfer to the skin of a fowl, said adhesive layer lying within the marginal limits of the underlying layers and said adhesive layer having an affinity for the natural oils and moisture exuding from the skin of the fowl.

6. A decalcomania transfer composed of edible and non-toxic ingredients for use on poultry comprising a paper backing having releasably affixed thereto, by means of a water soluble adhesive: (1) a thin sealer film of resin-free cellulose nitrate lacquer directly upon said water soluble adhesive containing as initially applied equal parts by volume of cellulose nitrate, castor oil, acetone, and xylene; (2) a transfer design applied over said sealer film; and (3) a resin-free adhesive layer adapted to engage the skin of a fowl and comprising, as initially applied, on a volume basis, 4 parts of ethyl cellulose, 3 parts of ethyl alcohol, one part of 2-butoxy ethanol, and one part of bleached white rosin.

7. A method of applying to the skin of a fowl a decalcomania transfer comprising a resin-free film releasably affixed on one side to a porous backing by means of a water soluble adhesive and having applied to its other side a transfer design layer and an organic solvent-softenable, resin-free, adhesive layer thereover, said method comprising the steps of wetting said backing with water to release said film therefrom, applying an organic solvent to said adhesive layer to activate the same without adversely affecting said film, pressing the transfer against the skin of the fowl with the activated adhesive in engagement therewith, removing said backing, and washing the exposed outer surface of said film substantially free of water soluble adhesive adhering thereto.

8. A method of applying to the skin of a fowl a decalcomania transfer comprising a thin sealer and carrier film of resin-free cellulose nitrate lacquer releasably affixed on one side to an absorbent paper backing by means of a water soluble adhesive and having applied to its other side a transfer design and a resin-free ethyl cellulose-containing adhesive layer thereover, said method comprising the steps of wetting said backing with water to release said film therefrom, applying to the transfer a solvent comprising ethyl alcohol to activate said adhesive layer, pressing the transfer against the skin of the fowl with the activated adhesive in engagement therewith, removing said paper backing, and washing the exposed outer surface of said film with water to substantially free the same of said water soluble adhesive.

9. A method of affixing to the skin of a fowl a decalcomania transfer having a porous backing and a design layer, which method comprises the steps of placing a layer of organic solvent-softenable, resin-free, adhesive having an affinity for the natural oils of a fowl over the design layer of the transfer within the marginal limits thereof, permitting said adhesive layer to dry, wetting the backing to release said design and adhesive layers therefrom, applying a solvent to the adhesive layer to activate the same, and pressing said transfer against the skin of the fowl with the activated adhesive layer in engagement therewith.

10. A method of applying to the skin of a fowl a decalcomania transfer comprising a resin-free film releasably affixed on one side to a porous backing by means of a water soluble adhesive and having applied to its other side a transfer design layer and an organic solvent-softenable, resin-free adhesive layer thereover, said method comprising the steps of wetting said backing with water to release said film therefrom, dipping the transfer in an organic solvent to activate said adhesive layer and to remove excess water therefrom while at the same time increasing the flexibility of said design layer and said film, pressing the transfer against the skin of the fowl with the activated adhesive in engagement therewith, removing said backing, and washing the exposed outer surface of said film substantially free of water soluble adhesive adhering thereto.

HARRY C. RATHKE.

REFERENCES CITED

The following references are of record in the file of this patent:

UNITED STATES PATENTS

| Number | Name | Date |
| --- | --- | --- |
| 470,899 | Robinson | Mar. 15, 1892 |
| 1,627,407 | Reese | May 3, 1927 |
| 1,893,626 | Lawrence | Jan. 10, 1933 |
| 2,057,625 | Carr et al. | Oct. 13, 1936 |
| 2,094,430 | Horne et al. | Sept. 28, 1937 |
| 2,184,077 | Hart | Dec. 19, 1939 |
| 2,231,262 | Fridolph | Feb. 11, 1941 |
| 2,242,729 | Ritchie | May 20, 1941 |
| 2,271,491 | Rathke | Jan. 27, 1942 |
| 2,429,986 | Bowers | Nov. 4, 1947 |

FOREIGN PATENTS

| Number | Country | Date |
| --- | --- | --- |
| 317,871 | Great Britain | Aug. 21, 1929 |
| 471,219 | Great Britain | Aug. 31, 1937 |

OTHER REFERENCES

Hercules, Ethyl Cellulose—1944—pages 18, 26, 28, 35–37.